Feb. 15, 1949.  L. F. THIRY  2,462,011
CUSHIONING SUPPORT

Filed June 2, 1945  2 Sheets-Sheet 1

INVENTOR.
Leon F. Thiry
BY
Evans & McCoy
ATTORNEYS

Feb. 15, 1949.    L. F. THIRY    2,462,011
CUSHIONING SUPPORT
Filed June 2, 1945    2 Sheets-Sheet 2

INVENTOR.
Leon F. Thiry
BY
Evans + McCoy
ATTORNEYS

Patented Feb. 15, 1949

2,462,011

UNITED STATES PATENT OFFICE 2,462,011

CUSHIONING SUPPORT

Leon F. Thiry, Montclair, N. J., assignor to The General Tire & Rubber Company, Akron, Ohio, a corporation of Ohio Application June 2, 1945, Serial No. 597,334

19 Claims. (Cl. 248—10)

This invention relates to supports for instruments, machines, or other structures in which elastic rubber in employed as a cushioning means for absorbing shocks and damping vibrations.

It is an object of the invention to provide a support of the type referred to which is of simple and compact construction and which has improved shock absorbing characteristics.

A further object is to provide a support employing a circumferential cushioning unit of rubber that is an effective absorber of shocks applied either axially or radially.

A further object is to provide a support of the type referred to providing a series of spaced rubber cushions in which the construction and assembly of the support is simplified by forming the cushions as a part of a one piece elastic rubber unit.

With the above and other objects in view, the invention may be said to comprise the support as illustrated in the accompanying drawings hereinafter described and particularly set forth in the appended claims, together with such variations and modifications thereof as will be apparent to one skilled in the art to which the invention pertains.

Reference should be had to the accompanying drawings forming a part of this specification, in which.

Figure 1:
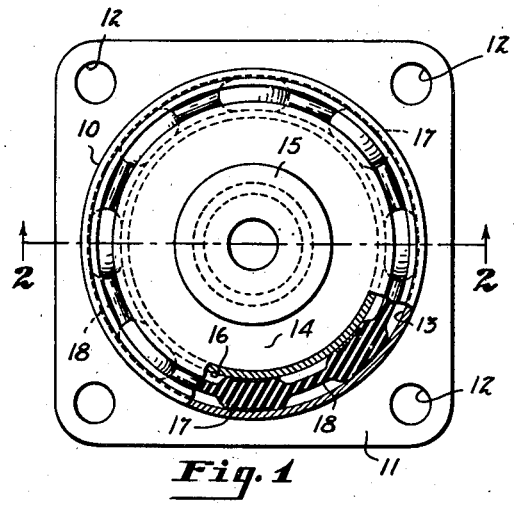
Figure 1 is a top plan view of a support embodying the invention.
Figure 2:
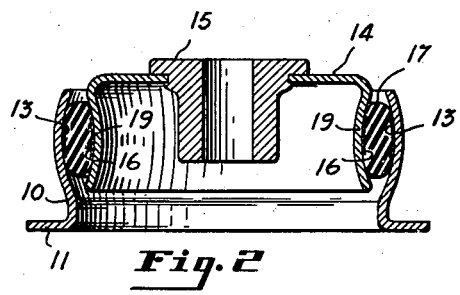
Fig. 2 is a section taken on the line indicated at 2—2 in Fig. 1.
Figure 3:
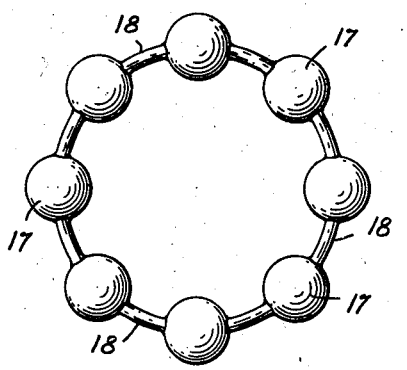
Fig. 3 is a top plan view of the rubber cushioning element employed in the support shown in Figs. 1 and 2.

In Figs. 1, 2 and 3 of the drawings, a support is shown which has an outer, tubular member 10 that is provided with a base flange 11 having bolt holes 12 by means of which the member 10 may be attached to a stationary support. The tubular member 10 has a transversely concave interior face 13 within which is mounted an inner member 14 of cup shape which may have a central attaching member 15 to receive a portion of the instrument or machine carried by the support. The inner member 14 has a transversely concave exterior seating face 16 that is within and opposed to the concave face 13 of the outer member 10. The inner member 14 is supported upon a series of circumferentially spaced rubber blocks 17 that are under compression between the concave faces 13 and 16 of the outer and inner members. The concave faces 13 and 16 are so disposed that movements of the inner members 14 both upwardly and downwardly are cushioned by the blocks 17, the faces 13 and 16 providing an annular block receiving space that is restricted at the ends and having opposed inclined portions between which the blocks 17 are compressed upon movement of the inner members 14 either upwardly or downwardly with respect to the outer member.

To facilitate the assembly of the support and to maintain the proper spacing of the rubber cushioning blocks 17, these blocks are formed as a part of a one piece annular unit and are maintained in circumferentially spaced relation by connecting webs 18 of relatively small cross section which join adjacent blocks and which are formed integrally with the blocks. The cushioning unit may be formed in a vulcanizing mold having blocks forming cavities connected by web forming passages. The thickness of the webs 18 is preferably less than the width of the space between the seating faces 13 and 16, so that they do not interfere with the circumferential extension of the blocks 17 when the blocks are subjected to radial compression. In order to hold the blocks in proper position and to prevent circumferential slippage a suitable rubber-to-metal adhesive may be applied to the blocks before assembly thereof with the inner and outer sections 14 and 10, so that the inner and outer faces of the blocks will be adhesively secured as indicated at 19 in Fig. 2, to the faces 13 and 16.

Figure 4:
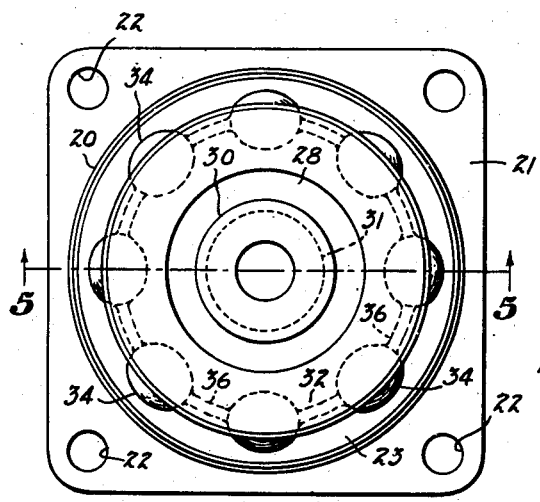
Fig. 4 is a top plan view showing a support of modified construction embodying the invention.
Figure 5:
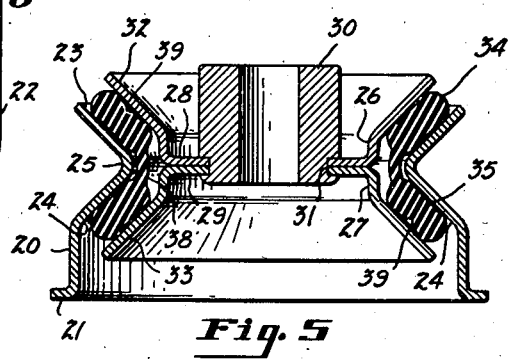
Fig. 5 is a section taken on the line indicated at 5—5 in Fig. 4.
Figure 6:
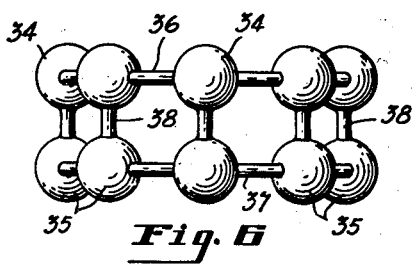
Fig. 6 is a side elevation of the cushioning unit employed in the support shown in Figs. 4 and 5.

In Figs. 4, 5 and 6 of the drawings a support is provided which has an outer tubular member 20 provided with a base flange 21 and bolt holes 22 for attachment to a floor or other fixed support. The tubular member 20 has interior conical seating faces 23 and 24 that are oppositely inclined from a restricted portion 25, the conical faces 23 flaring upwardly as shown in Fig. 5 and the conical faces 24 flaring downwardly. An inner member composed of upper and lower cup shaped sections 26 and 27 is mounted within the tubular outer member 20, the cup shaped sections 26 and 27 having flat bottoms 28 and 29 that are secured together in abutting relation by means of an attaching member 30 which has a reduced end portion 31 extending through alined central openings in the bottoms 28 and 29 and riveted to secure the sections 26 and 27 together. The members 26 and 27 have flaring conical walls 32 and 33 that overlie and underlie the conical faces 23 and 24 of the tubular outer member 20.

Circumferentially spaced elastic rubber blocks 34 are interposed between the conical seats 32 and 23 and similar circumferentially spaced blocks 35 are interposed between the conical seats 24 and 33. The blocks 34 are uniformly spaced and joined together by means of integral webs 36 of small cross section which are joined at their ends to central portions of the blocks. The second row of blocks 35 are joined by arcuate webs 37 of relatively small cross section which join the blocks 35 in the same manner as the blocks 34 are joined by the webs 36. Axially extending flexible and elastic webs 38 join and space the blocks 34 from the blocks 35. By means of the webs 36, 37 and 38, the two rows of blocks 34 and 35 are joined together in an annular unit. The blocks 34 and 35 and webs 36, 37 and 38 may be in the form of a molded elastic rubber unit and the thickness of the webs is preferably less than the space between the inner and outer members of the support so that the rubber of the blocks may be displaced circumferentially as well as axially under compression, to permit greater relative movements of the inner and outer members between which the blocks are mounted. The blocks 34 and 35 may be adhered to the opposing faces of the inner and outer members of the support, as indicated at 39 in Fig. 5.

In assembling the support, the cushioning unit may be inserted within the tubular outer member 20 with the blocks 34 above and the blocks 35 below the restricted portion 25 of the member 20, whereupon the sections 26 and 27 may be inserted into the opposite ends of the tubular member 20 and brought together, compressing the blocks 34 and 35 against the faces 23 and 24. The attaching member 30 may be inserted into the registering openings of the sections 26 and 27 and may then be riveted to secure the sections together. The webs 38 will readily bend around the restricted portion 25 of the outer member and these webs together with the webs 36 and 37 insure the proper positioning of the blocks in the assembly.

In Figs. 7, 8, 9 and 10 of the drawings, another form of support is shown in which a tubular outer member 40 is provided, which has a base flange 41 provided with bolt holes 42 for attachment to a suitable fixed support. The outer member 40 has upwardly extending inwardly inclined tongues 43 projecting from its upper edge at circumferentially spaced points and correspondingly spaced integral tongues 44 which are intermediate the tongues 43 and which extend inwardly and downwardly from the lower portion of the member 40. An inner cup shaped member 45 is mounted within the outer member 40, the cup shaped member 45 having an exterior sleeve 46 attached thereto that is provided with upper and lower tongues or flanges 47 and 48 that overlie and underlie the tongues 44 and 43 carried by the outer member 40. Circumferentially disposed cushioning blocks 49 are interposed between the inclined seats formed by the tongues 43 and 48 and by the tongues 44 and 47.

Figure 7:
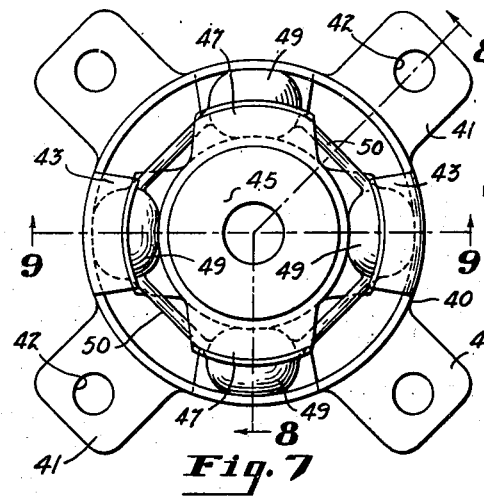
Fig. 7 is a plan view of another support embodying the invention.
Figure 8:
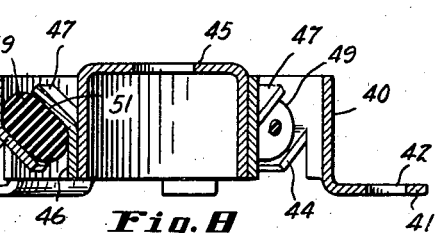
Fig. 8 is a section taken on the line indicated at 8—8 in Fig. 7.
Figure 9:
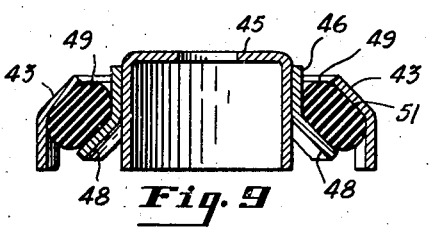
Fig. 9 is a section taken on the line indicated at 9—9 in Fig. 7.

As shown in Figs. 7, 8 and 9, four equiangularly spaced supporting blocks are provided, two diametrically opposed blocks being interposed between the inclined tongues 43 and 48 and two diametrically opposed blocks 49 being interposed between the inclined tongues 44 and 47 so that alternate blocks cushion downward thrusts of the inner member 45 while the other blocks cushion upward thrusts. The blocks 49 are formed as integral parts of an annular unit being joined by arcuate webs 50 of small cross section which serve to hold the blocks 49 in proper spaced relation and which facilitate the assembly of the support. The blocks 49 and webs 50 are preferably molded and vulcanized as an elastic rubber unit and the webs 50 offer little resistance to circumferential spreading of the blocks when they are subjected to compression. The blocks 49 may be adhesively secured to the tongues 43, 44, 47 and 48 as indicated at 51 in Figs. 8 and 9.

Figure 11:
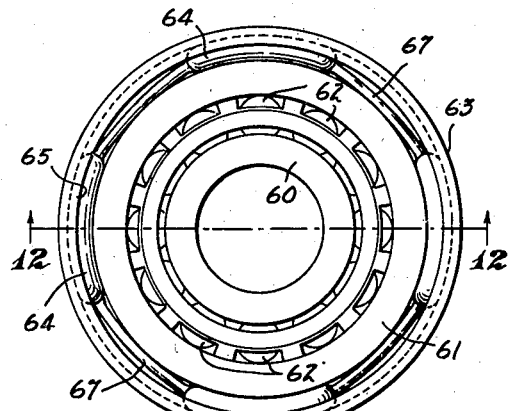
Fig. 11 is a plan view of a roller bearing support embodying the invention.
Figure 10:
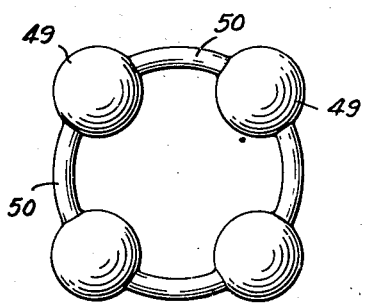
Fig. 10 is a plan view of the cushioning unit employed in the support shown in Figs. 7, 8 and 9.
Figure 12:
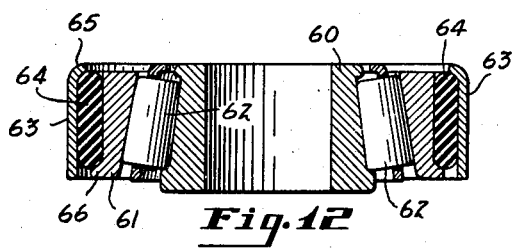
Fig. 12 is a section taken on the line indicated at 12—12 in Fig. 11.

In Figs. 11 and 12 the invention is shown applied to a roller bearing support, the roller bearing comprising an inner race ring 60 and an outer race ring 61 and bearing rollers 62. An external tubular supporting member 63 is provided and circumferentially spaced cushioning blocks 64 are interposed between the tubular member 63 and the outer race ring 61, the tubular member 63 and the race ring 61 being provided with inwardly and outwardly projecting shoulder flanges 65 and 66 which engage the blocks 64 to limit relative axial movements of the bearing and supporting members.

The blocks 64 are formed as part of an annular elastic rubber unit which comprises the blocks 64 and arcuate webs 67 joining the blocks, the webs 67 being of relatively small cross section and having a radial thickness less than the radial depth of the space between the tubular supporting member 63 and the outer race ring 61, so that the webs are not under compression and permit circumferential spreading of the blocks under compression.

Figure 13:
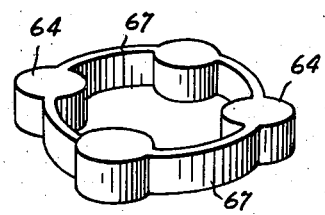
Fig. 13 is a perspective view of a cushioning unit that may be used in the bearing support.
Figure 14:
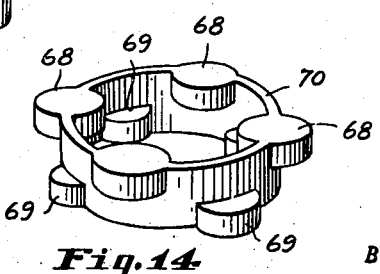
Fig. 14 is a perspective view of a slightly modified form of cushioning unit that may be used as a bearing support.

In Fig. 14 of the drawings, an elastic rubber cushioning unit which may be substituted for the unit shown in Fig. 13 is illustrated. In this unit two circumferential rows of blocks 68 and 69 are provided, the blocks 69 being spaced axially with respect of the blocks 68 and being offset circumferentially with respect to the blocks 68, the blocks 68 and 69 being joined in an annular unit by means of an annular web 70 integral with the blocks.

In each of the modifications herein disclosed, a one piece rubber cushioning unit is employed which is in the form of a ring molded in one piece with the blocks spaced circumferentially and joined by webs of small cross section so that the unit may be readily inserted in an annular space between inner and outer members of a support and held in proper spaced relation during assembly.

The cushioning by means of angularly spaced rubber blocks provides a support having considerable flexibility in all directions and having very desirable shock absorbing characteristics, the spaced blocks providing a relatively great amplitude of movement because of the spaces between blocks into which the rubber may be forced when compressed. The forming of the cushioning blocks as part of a one piece cushioning unit makes it unnecessary to provide the rigid portions of the support with individual block retaining elements, thereby greatly simplifying the construction and decreasing the difficulty of assembly.

It is to be understood that the term "rubber" as employed herein is intended to include synthetic rubbers and other elastic rubber-like compositions suitable for use as cushioning elements.

It is to be understood that variations and modifications of the specific device herein shown and described for purposes of illustration, may be made without departing from the spirit of the invention.

What I claim is:

1. A support comprising two members having circumferential seating portions disposed one within the other, and an endless one piece elastic rubber cushioning unit surrounding the inner member and interposed between said seating portions, said unit comprising a series of cushioning blocks spaced apart by relatively thin intermediate portions integrally joined at their ends to said blocks.

2. A support comprising an outer member having an opening provided with a marginal seating portion, an inner member having a circumferential seating portion opposed to the seating portion of the outer member, and an endless one piece elastic rubber cushioning unit surrounding the inner member and interposed between said seating portions, said unit comprising a series of cushioning blocks spaced apart by relatively thin elongated intermediate portions integrally joined at their ends to said blocks.

3. A support comprising an outer member having an inwardly facing annular seat, an inner member having an outwardly facing annular seat, and an endless elastic rubber cushioning unit surrounding the inner member and interposed between said seats, said unit comprising a series of cushioning blocks spaced apart by relatively thin intermediate portions integrally joined at their ends to said blocks.

4. A support comprising an outer member having an inwardly facing annular seat, an inner member having an outwardly facing annular seat, and an annular elastic rubber cushioning unit surrounding said inner member and interposed between said seats, said unit comprising cushioning blocks interposed between and engaged by said seats and circumferentially extending integral connecting webs of relatively small cross section joined at their ends to said blocks and spacing the same.

5. A support comprising an outer member having an opening, an inner member centrally disposed with respect to said opening, oppositely facing inclined seats carried by said members adjacent the margin of the opening, and an endless one piece elastic rubber cushioning unit disposed in said opening between said seats and comprising spaced cushioning blocks under compression between said seats and intermediate circumferentially extending uncompressed portions of relatively small cross section connecting said blocks.

6. A support comprising an outer member having an opening and a circumferentially continuous seat at the margin of the opening that is inclined to the axis of said member, an inner member having a continuous circumferential inclined seat opposed to the seat on the outer member, and an endless elastic rubber cushioning unit within said opening between said seats, said unit comprising a series of cushioning blocks under compression between said seats and intermediate uncompressed portions of relatively small cross section connecting and spacing said blocks.

7. A support comprising an outer member having an inwardly facing conical seat, an inner member having an outwardly facing conical seat, and a one piece endless elastic rubber cushioning unit surrounding the inner member and comprising spaced cushioning blocks under compression between said seats and flexible intermediate uncompressed portions of relatively small cross section connecting said blocks.

8. A support comprising an outer member having an opening and inwardly facing seating portions at the margin of the opening that are oppositely inclined with respect to a central axis, an inner member having outwardly facing seating portions within the outer member and oppositely inclined with respect to the central axis, and an endless elastic rubber cushioning unit comprising circumferentially spaced blocks, interposed between the seating portions of the inner and outer members and intermediate portions of relatively small cross section connecting said blocks.

9. A support comprising a tubular outer member having a restricted portion and oppositely flaring conical seating portions on opposite sides of the restricted portion, an inner member having outwardly facing conical seating portions opposed to the seating portions of the outer member, and an elastic rubber cushioning element comprising two rows of circumferentially spaced blocks interposed between the conical seating portions of said members on opposite sides of said restricted portion, circumferentially extending portions of relatively small cross section integral with and connecting the circumferentially spaced blocks of each row and axially extending portions of relatively small cross section, each integral with and connecting a block of one row with a block of the other.

10. A support comprising an outer member having an opening and spaced inwardly facing inclined seats, an inner member having spaced inclined seats opposed to the seats of the outer member, and an elastic rubber cushioning unit having spaced cushioning blocks under compression between the spaced seats of said members and intermediate portions of relatively small cross section connecting said blocks.

11. A support comprising an outer member having an interior cylindrical seating face and an interior shoulder at one end of said face, an inner member having an exterior cylindrical seating face and an exterior shoulder at one end of its seating face, and an elastic rubber cushioning ring between said seating faces and confined between said shoulders, said ring comprising a series of circumferentially spaced blocks under compression between said seating faces and relatively thin intermediate portions connecting said blocks.

12. A support comprising an outer member having an interior cylindrical seating face and an interior shoulder at one end of said face, an inner member having an exterior cylindrical seating face and an exterior shoulder at one end of its seating face, and an elastic rubber cushioning ring between said seating faces and confined between said shoulders, said ring comprising a series of circumferentially and axially spaced cushioning blocks under compression between said seating faces and a relatively thin web joining said blocks.

13. A one piece annular elastic rubber cushioning unit comprising a series of spaced cushioning blocks and connecting and spacing portions joined at their ends to said blocks, said connecting portions being relatively thin radially and disposed between the radially innermost and radially outermost face portions of the blocks.

14. A one piece annular cushioning unit of elastic rubber comprising a series of circumferentially spaced cushioning blocks and elongated connecting portions of relatively small cross section interposed between the blocks and joined at their ends to said portions of blocks that are intermediate opposite radially alined face portions of the blocks and intermediate opposite axially alined face portions of the blocks.

15. An annular one piece elastic rubber cushioning unit comprising a series of spaced cushioning blocks spaced circumferentially and axially, and joining portions of relatively small radial thickness interposed between the blocks.

16. An annular one piece elastic rubber cushioning unit comprising axially spaced rows of circumferentially spaced cushioning blocks, circumferentially extending connecting portions of relatively small section interposed between the blocks of each row, and axially extending connecting portions of relatively small cross section interposed between blocks in axially spaced rows.

17. An annular one piece elastic rubber cushioning unit comprising a series of circumferentially and axially spaced cushioning blocks and radially thin intermediate portions joining said blocks.

18. A support comprising two spaced relatively movable members having opposed seats, and a cushioning unit interposed between said members and comprising an endless band of elastic rubber having a series of circumferentially spaced enlargements forming cushioning blocks and an equal number of circumferentially extending webs of relatively small cross section integrally joined at their ends by said blocks and interposed between the same to hold the blocks in circumferentially spaced relation, said cushioning unit being interposed between said members with the blocks spaced apart between said opposed seats and in engagement therewith to yieldably hold said members in spaced relation.

19. A support comprising two spaced relatively movable members having opposed annular seats, and a cushioning unit comprising a one piece endless band of elastic rubber having a series of circumferentially spaced approximately spherical enlargements and an equal number of circumferentially extending connecting links of relatively small cross section integrally joined at their ends to central portions of the opposed faces of adjacent enlargements and holding the enlargements in circumferentially spaced relation, said cushioning unit being interposed between said members with the enlargements spaced apart between said opposed seats and in engagement therewith to yieldably hold said members in spaced relation.

LEON F. THIRY.

REFERENCES CITED

The following references are of record in the file of this patent:

UNITED STATES PATENTS

| Number | Name | Date |
|---|---|---|
| 758,457 | Macfarlane | Apr. 26, 1904 |
| 1,871,861 | Rossman | Aug. 16, 1932 |
| 2,070,081 | Henry | Feb. 9, 1937 |
| 2,138,176 | Keys | Nov. 29, 1938 |
| 2,179,959 | Schroedter | Nov. 14, 1939 |
| 2,353,952 | Yerzley | July 18, 1944 |
| 2,386,463 | Hile | Oct. 9, 1945 |

FOREIGN PATENTS

| Number | Country | Date |
|---|---|---|
| 140,465 | Great Britain | June 20, 1921 |
| 499,232 | Great Britain | Jan. 20, 1939 |
| 829,524 | France | June 29, 1938 |
| 606,616 | Germany | Feb. 18, 1933 |

Certificate of Correction

Patent No. 2,462,011.　　　　　　　　　　　　　　　　　　　February 15, 1949.

LEON F. THIRY

It is hereby certified that error appears in the printed specification of the above numbered patent requiring correction as follows:

Column 7, line 22, claim 14, for "said portions of" read *portions of said*; and that the said Letters Patent should be read with this correction therein that the same may conform to the record of the case in the Patent Office.

Signed and sealed this 28th day of June, A. D. 1949.

[SEAL]

THOMAS F. MURPHY,
*Assistant Commissioner of Patents.*